United States Patent Office 3,062,777
Patented Nov. 6, 1962

3,062,777
GRAFT COPOLYMERS OF STYRENE ON BUTADIENE RUBBERS AND METHOD FOR MAKING SAME
Ivey Allen, Jr., Kenneth T. Garty, and John A. Stenstrom, Bloomfield, N.J., assignors to Union Carbide Corporation, a corporation of New York
No Drawing. Filed Apr. 14, 1953, Ser. No. 348,836
11 Claims. (Cl. 260—45.5)

This invention relates to novel rubbery polymeric products obtained by reacting styrene monomer in suitable proportions with rubbery type copolymers of butadiene-1,3 and styrene to form styrene grafted butadiene-styrene copolymers. The grafted copolymers of this invention are particularly characterized by their insolubility in solvents capable of dissolving copolymers of butadiene-1,3 and styrene and find particular utility as plasticizers for normally solid polystyrene homopolymers.

The production of synthetic rubbers by emulsion copolymerization of at least an equal amount, and usually more, of butadiene-1,3 with styrene in the presence of suitable catalysts is well known. These rubbery copolymers are believed to be essentially linear chain molecules formed primarily from 1,4-addition of butadiene molecules, and with random distribution of individual styrene nuclei along the chains. A structural formula generally accepted as typical of a butadiene-styrene rubbery copolymer is reproduced here:

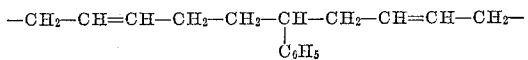

It has now been found that by reacting styrene monomer with rubbery copolymers of butadiene and styrene containing per 100 parts by weight thereof from 3 to 50 parts by weight of combined styrene and the balance being combined butadiene, that a significant amount of the styrene monomer chemically combines with or is grafted on the butadiene-styrene copolymer in such manner that a new product is obtained. This new product is unlike the original rubbery copolymer in that it is stiffer and less extensible both at normal and elevated temperatures and is insoluble in solvents for the original copolymer, and on the other hand, is unlike normally solid polystyrene homopolymers in that the new product is definitely rubbery in its physical characteristics as distinguished from the brittle glass-like properties of polystyrene at normal temperatures, and furthermore, is insoluble in various solvents for polystyrene. The balance of the styrene monomer in the reaction system that does not combine with the butadiene-styrene copolymer is concurrently polymerized to a normally solid polystyrene homopolymer.

Examination of the infrared spectra of the new styrene grafted products which have been separated from the polystyrene simultaneously formed in the reaction as by solvent extraction of the polystyrene component shows the presence of more combined styrene nuclei in the grafted product than were present in the original butadiene-styrene copolymer. It may be postulated that the styrene which has been combined with or grafted on the copolymer is present as side chains as illustrated by the following fragmentary formula:

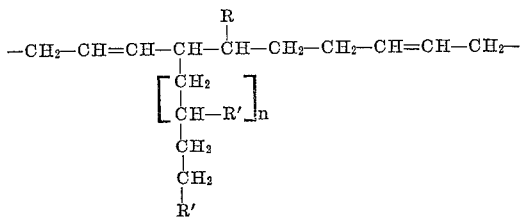

in which R is the phenyl ring of a styrene nuclei originally present in the copolymer before reaction with styrene monomer and R' represents the phenyl ring of grafted styrene nuclei and $n$ is zero or more.

Neither the distribution nor length of these grafted styrene chains is presently capable of analytical determination. Qualitatively, the presence of the grafted styrene chains is demonstrated by the improved compatibility of the styrene grafted butadiene-styrene copolymers with normally solid polystyrene homopolymers, whereas the absence of any such grafted styrene chains in the original butadiene-styrene copolymer is the probable reason for its comparatively poorer compatibility with polystyrene homopolymers.

More particularly, mixtures of a rubbery butadiene-styrene copolymer and a polystyrene homopolymer exhibit somewhat higher impact strength and elongation than the polystyrene homopolymer, but the poor compatibility of the two components is evidenced by the pearlescent appearance of the mixtures, and a laminated like distribution of copolymer and polystyrene which is evidenced by a delaminating type of fracture when molded samples are torn apart. In contrast, mixtures of comparable proportions of a styrene-grafted butadiene styrene copolymer and a polystyrene homopolymer exhibit even greater impact strength and elongation and do not display the pearlescent appearance or laminated structure shown by the mixtures of the rubbery butadiene-styrene copolymer and a polystyrene homopolymer.

Further qualitative evidence that the styrene monomer has been chemically combined or grafted with the butadiene-styrene copolymer is noted in the action of such solvents as benzene, toluene, chloroform, carbon tetrachloride dioxane, carbon disulfide and styrene monomer on the styrene grafted copolymers, all of which will substantially dissolve the type of butadiene-styrene copolymer used as a reactant in this invention and also polystyrene homopolymers, but merely swell the styrene grafted copolymers when it is submerged in these solvents at 25° C.

A quantitative test for determining the amount of styrene grafted on or combined with the butadiene-styrene copolymer, and such amounts of styrene that have polymerized as polystyrene homopolymer during the reaction of styrene monomer with the butadiene-styrene copolymer is to immerse pellets of the reaction product in dimethylformamide, a known solvent for polystyrene homopolymers, but in which the original butadiene-styrene copolymers, and the styrene grafted butadiene-styrene copolymers may swell in size, but are otherwise insoluble. Specifically, 100 grams of the reaction product are dispersed in about 400 to 1000 milliliters of dimethyl formamide for 12 to 24 hours at room temperature to extract polystyrene homopolymers and any unreacted styrene from the reaction product by dissolution. Usually 2 to 5 successive extractions with fresh solvent in each extraction is sufficient to bring the insoluble component of the reaction product to a constant dry weight. Solvent removal, i.e. drying of the insoluble component can be carried out by placing the sample in a vacuum oven at 10–15 mm. pressure and with the temperature at 30° C. to 50° C. The weight of the finally isolated insoluble product minus the weight of the original butadiene-styrene copolymer used in producing 100 grams of substantially volatile-free reaction products gives the weight of the styrene which has grafted or combined on to the butadiene-styrene copolymer in 100 grams of the sample. The data obtained in this manner may be used to express the degree of grafting by employing the following equation:

Degree of grafting =

$$100 \times \frac{\text{Wt. insoluble product} - \text{wt. original copolymer}}{\text{wt. original copolymer}}$$

Otherwise stated, if the content of butadiene-styrene copolymer originally present in a reaction mixture is 100 parts by weight, then the degree of grafting directly expresses the parts by weight of styrene which have chemically combined with said amount of butadiene-styrene copolymer to form a styrene grafted butadiene-styrene copolymer.

The determination of the degree of grafting in a styrene grafted butadiene-styrene copolymer is illustrated by the following case: A styrene grafted butadiene-styrene copolymer was obtained by reacting 70 parts by weight of styrene in the presence of 30 parts by weight of a rubbery copolymer of butadiene-1,3 and styrene in which the bound styrene was 10% of the copolymer weight. After four successive extractions of 100 grams of the substantially volatile-free reaction product with 400 to 600 milliliter volumes of dimethylformamide, 40 grams of a rubbery residue were isolated and dried. Since 30 grams of the sample was due to the original butadiene-styrene copolymer, the additional 10 grams in the isolated insoluble product was the weight of the grafted styrene nuclei. Therefore, the degree of grafting was 33 in this case.

$$\frac{40-30}{30} \times 100 = 33$$

It has been found that those styrene grafted butadiene-styrene copolymers having a calculated degree of grafting ranging between 3 and 100 (equivalent to between 3 and 100 parts by weight of styrene having been reacted on 100 parts by weight of butadiene-styrene copolymer) are most compatible with normally solid polystyrene homopolymers. Whereas those styrene-grafted butadiene-styrene copolymers having a degree of grafting less than 3 have not been sufficiently modified by reaction with styrene monomer to be significantly more compatible with polystyrene than the original butadiene-styrene copolymer. Styrene grafted butadiene-styrene copolymers having a degree of grafting more than 100 contain a significant amount of polymeric constituents which give rise to visible streaks and surface depressions (sink marks) in molded articles of polystyrene plasticized with such styrene-grafted butadiene-styrene copolymers. Furthermore, the grafted copolymers having a degree of grafting more than 100 are stiffer at any given temperature than those of a lower degree of grafting and require higher molding temperatures to impart adequate molding plasticity. Higher molding temperatures are also required to mold polystyrene homopolymers plasticized with such highly grafted butadiene-styrene copolymers.

The extent or degree of grafting of styrene monomer on a butadiene-styrene copolymer can be controlled by the use of definite proportions of styrene monomer to butadiene-styrene copolymer in the reaction system. In general, for a given set of conditions, as the amounts of styrene monomer present in the reaction system are increased more grafting occurs.

Styrene grafted butadiene-styrene copolymers having a degree of grafting between 3 and 100 can be prepared by reacting substantially all (90% to 100%) the styrene to form styrene grafted butadiene-styrene copolymer and polystyrene homopolymer in a reaction mixture comprising styrene monomer and a suitable butadiene-styrene copolymer dispersed or dissolved in the styrene, said copolymer constituting between 20 and 60% by weight of the reaction mixture. Alternatively, in reaction procedures deliberately terminated before all the styrene has reacted, the initial reaction mixture may contain as much as 95% by weight of styrene monomer to 5% by weight of butadiene-styrene copolymer, but in order to avoid the formation of too highly grafted copolymers, the reaction should be terminated at a stage where the butadiene-styrene copolymer represents between 20 and 60% by weight of the reaction product solids, consisting of polystyrene homopolymer and styrene-grafted butadiene-styrene copolymer, the unreacted styrene present in the reaction mixture being removed therefrom by volatilization and preferably by distillation at sub-atmospheric pressures.

Although all the styrene-grafted butadiene-styrene copolymers having a degree of grafting between 3 and 100 exhibits adequate compatibility with polystyrene homopolymers those grafted copolymers obtained by reacting styrene with solid rubbery type butadiene-styrene copolymers wherein the bound styrene constitutes from 3 to about 25% by weight of the copolymer yield rubbery products which are preferred for incorporation with polystyrene homopolymers to produce plasticized compositions.

Table I depicts representative average results on the effect of 0–50% bound styrene content in the original rubbery butadiene polymer with regard to the plasticizing properties of styrene grafted butadiene polymers prepared therefrom and incorporated in normally solid polystyrene homopolymers. These butadiene polymers were all reacted with styrene monomer by dissolving 20 to 60 parts by weight of the butadiene polymer in 80 to 40 parts of styrene monomer, and then reacting the solutions by heating for 2 days at 80° C., then for two days at 90° C., followed by two more days at 100° C., and finally for 3 days at 120° C., resulting in practically complete (98%) reaction of the styrene monomer and yielding a homogeneous mixture of polystyrene homopolymer and styrene grafted butadiene polymer. Each mixture was then blended by mixing on heated rolls, with an additional amount of a commercial polystyrene homopolymer having an approximate average molecular weight, as determined from the well known Staudinger viscosity formula, of about 65,000 to form plasticized polystyrene compositions, each then containing a quantity of styrene-grafted butadiene polymer corresponding to a 15% by weight net quantity of the butadiene polymer.

TABLE I

| Bound Styrene by Weight in Original Butadiene Polymer Used to Prepare Styrene Grafted Butadiene Polymer | Izod Impact Strength (ft.lbs./Inch of Milled Notch ASTM D256) of Polystyrene plasticized with Styrene Grafted Butadiene Polymer | |
|---|---|---|
| | 77° F. | −20° F. |
| 0% (polybutadiene) | 1.9 | 0.5 |
| 3% | 3.0 | 1.0 |
| 6% | 3.6 | 1.2 |
| 10% | 5.3 | 1.7 |
| 23.5% | 4.5 | 1.5 |
| 30% | 1.3 | 0.4 |
| 40–45% | 1.6 | 0.4 |

By way of comparison, commercial polystyrene homopolymers containing no plasticizer whatsoever have an Izod impact strength at 77° F. of about 0.25 to 0.60 ft. lbs. and about 0.2 to 0.5 ft. lbs. at −20° F. Also of interest is the fact that normally solid polystyrenes when physically blended with rubbery copolymers of butadiene and styrene which have not been subjected to reaction with styrene as herein described yield plasticized polystyrene compositions of considerably lower impact strength. For example, a composition prepared by blending on heated rolls 85 parts by weight of polystyrene homopolymer and 15 parts by weight of a rubbery copolymer of butadiene and styrene containing 23.5% of bound styrene and an Izod impact strength of only 1.5 to 2.0 ft. lbs. at 77° F. and 0.5 to 0.7 ft. lbs. at −20° F.

The improvements in impact strength and elongation under tension obtained by using the styrene-grafted butadiene-styrene copolymers as plasticizers in polystyrene homopolymers are highly valuable particularly in that they are not accompanied by any serious losses in tensile and flexural strengths, flexural modulus, heat distortion temperature or in resistance to water absorption. This is illustrated by the data in Table II in which is presented various physical properties of unplasticized polystyrene, of polystyrene compositions containing 10, 20 and 30% by weight of a butadiene-styrene copolymer per se as plasticizer, and of polystyrene compositions plasticized with equivalent amounts of the same copolymer having styrene grafted thereon. The copolymer used in these experiments was a rubbery emulsion polymerized copolymer of butadiene-1,3 and styrene, the copolymer containing 10% by weight of bound styrene. For the compositions containing the unmodified copolymer, 10, 20 and 30 parts by weight of the copolymer were mechanically blended, respectively, with 90, 80, and 70 parts by weight of polystyrene homopolymer having an average molecular weight between 65,000 and 75,000 by milling on rolls at about 150° C. for about 5 minutes. For the other compositions a styrene-grafted butadiene-styrene copolymer product produced in admixture with polystyrene homopolymer was prepared by reacting together 70 parts by weight of styrene and 30 parts by weight of the butadiene-styrene copolymer. The resultant thermoplastic reaction product had an approximate analysis of 36.4% by weight of styrene grafted butadiene-styrene copolymer and 63.6% by weight of normally solid polystyrene homopolymer. Hence, although this reaction product contained a 36.4% content by weight of styrene grafted copolymer as plasticizer, for purposes of determining the plasticizing effect of a given quantity of butadiene-styrene copolymer, regardless of how it was incorporated or reacted in admixture with polystyrene homopolymer, this 36.4% content of grafted copolymer was considered equivalent to a content of 30% by weight of butadiene-styrene copolymer. On the same basis two portions of the reaction product were then blended for 5 minutes at 150° C. on heated rolls with a sufficient amount of the same lot of polystyrene homopolymer employed for blending with the butadiene-styrene copolymer, per se, to produce plasticized compositions containing respectively 24.2% and 12.1% by weight of styrene grafted butadiene-styrene copolymer, for direct comparison purposes with the polystyrene compositions plasticized respectively with 20% and 10% by weight of the butadiene-styrene copolymer, per se.

The advantages of using the styrene-grafted butadiene styrene copolymers as polystyrene plasticizers instead of the unmodified butadiene-styrene copolymers are made fully evident from an inspection of the impact strength and percent elongation values in Table II. Especially important are the higher impact strengths obtained at subzero temperatures, since shock resistance in a plastic material exposed to low temperature is essential for many military defense applications. The superior low-temperature shock resistance obtained by the use of styrene grafted butadiene-styrene copolymers as plasticizers for polystyrene homopolymers is further illustrated by the following test results: Two polystyrene compositions were prepared which contained, respectively, 15% by weight of a butadiene-styrene copolymer (10% bound styrene) and 18% by weight of a styrene grafted butadiene-styrene copolymer (corresponding to 15% by weight as butadiene-styrene copolymer per se). The compositions were prepared by using the same butadiene-styrene copolymer and procedures employed for the experiments of Table II. Each composition was molded, under the same conditions, to give 2″ x 3″ x ⅛″ test plaques. Then, as the temperature of the plaques was reduced in steps of 10° F., shock resistance was determined by dropping a one-pound steel ball from a height of two feet on the surface of the plaques which were edge-supported. The composition plasticized with butadiene-styrene copolymer per se broke when the temperature was reduced to −30° F. However, the composition containing the styrene grafted butadiene-styrene copolymer did not break until the temperature reached −60° F.

Due to the very high impact resistance imparted to polystyrene compositions plasticized with styrene grafted butadiene-styrene copolymer, such plasticized compositions give superior performance when fabricated into articles, such as toys, telephone housings, shot gun shells, battery cases, horns for carbon dioxide fire extinguishers, and flashlight cases. The so plasticized compositions can be formed into a variety of complex shapes by compression molding, injection molding, extrusion and calendering techniques.

In the preparation of the styrene grafted butadiene-styrene copolymer by a bulk type of reaction, the reaction temperature is maintained between about 70° C. and 200° C., such temperature range being effective not only in promoting the desired reaction between styrene mono-

TABLE II

*Properties of Polystyrene Compositions*

| Plasticizer | None | Butadiene-Styrene Copolymer | | | Styrene Grafted Butadiene-Styrene Copolymer | | |
|---|---|---|---|---|---|---|---|
| Percent by weight of styrene-grafted butadiene-styrene copolymer | 0 | 0 | 0 | 0 | 12.1 | 24.2 | 36.3 |
| Percent by weight of butadiene-styrene copolymer | 0 | 10 | 20 | 30 | 0 | 0 | 0 |
| Percent by weight polystyrene homopolymer | 100 | 90 | 80 | 70 | 87.9 | 75.8 | 63.7 |
| Izod Impact Strength (ASTM D-256): | | | | | | | |
| 77° F | 0.6 | 1.0 | 3.6 | 4.4 | 2.7 | 7.6 | 8.8 |
| −20° F | 0.5 | 0.5 | 0.7 | 1.4 | 1.0 | 1.8 | 5.0 |
| −40° F | 0.4 | 0.3 | 0.6 | 0.9 | 0.6 | 1.7 | 3.2 |
| −60° F | 0.2 | 0.3 | 0.4 | 0.4 | 0.4 | 1.0 | 2.4 |
| Tensile Strength, lbs./sq. in. (ASTM D638) | 7,200 | 5,500 | 3,800 | 2,500 | 4,800 | 3,700 | 2,700 |
| Flexural Strength, lbs./sq. in. (ASTM D790) | 16,600 | 12,000 | 8,600 | 6,400 | 11,600 | 8,500 | 5,000 |
| Flexural Modulus × $10^5$ (ASTM D790) | 5.1 | 4.1 | 3.6 | 2.9 | 4.2 | 3.2 | 3.0 |
| Percent Elongation at Tensile Break (ASTM D638) | 2 | 4 | 8 | 10 | 16 | 24 | 31 |
| Heat Distortion, ° C. (ASTM D648) | 87 | 86 | 81 | 80 | 84 | 84 | 82 |
| Dielectric Constant $10^6$ Cycles (ASTM D150) | 2.5 | -------- | 2.5 | -------- | -------- | 2.5 | -------- |
| Percent Water Absorption by weight (10 days immersion) | 0.1 | -------- | 0.4 | -------- | -------- | 0.2 | -------- | mer and the butadiene-styrene copolymer, but also in favoring the accompanying polymerization reaction of part of the styrene monomer to polystyrene homopolymers normally solid at room temperatures and having average molecular weights between 20,000 and 150,000, as determined by the Staudinger viscosity formula. In general, the average molecular weight of the polystyrene homopolymers formed during the reaction tends to be lower, the higher the reaction temperature being in this respect analogous to the known effect of polymerization reaction temperatures on styrene per se polymerized to polystyrene homopolymers. Lower bulk reaction temperatures than 70° C. can be used, but are impractical due to the prolonged reaction time required to obtain a satisfactory rate of production, and furthermore favor the production of high average molecular weight polystyrenes requiring higher molding temperatures.

A preferred procedure for bulk type reaction and polymerization is to heat to a reaction temperature between 100° and 140° C. a charge consisting of between 15 and 30% by weight of butadiene-styrene copolymer, the balance consisting of styrene monomer and reacting at such temperatures until the mixture contains between 50 and 70% by weight of solid reaction products and then removing the unreacted styrene monomer by distillation at reduced pressures and at temperatures up to 240° C. to obtain a product having a solids content of 98.0 to 99.5 percent.

Exclusion of oxygen particularly from the bulk reaction systems is desirable to prevent oxidation and to obtain the lightest colored reaction products. Nitrogen or other inert gas can be used to purge the reaction equipment of atmospheric oxygen and if desired can be present throughout the reaction as an inert blanketing atmosphere.

Catalysts are not essential for the reaction to take place under bulk conditions, although it has been found that any peroxide or free radical catalyst hitherto employed for the bulk polymerization of styrene monomer to polystyrene homopolymers can be used to accelerate the reaction.

Emulsion polymerization techniques have also been found effective in producing styrene-grafted butadiene-styrene copolymers. In this type of reaction from 20 to 60 parts by weight of the butadiene-styrene copolymer solids, in latex form, are mixed with from 80 to 40 parts by weight, respectively, of styrene monomer, in a water emulsion, and the mixture is then reacted to complete consumption of the styrene as homopolymer and styrene grafted copolymer. In such reactions, the usual redox type catalyst, emulsifying agents and conditions employed for emulsion polymerization of styrene monomer to polystyrene homopolymers are satisfactory. Emulsion polymerization-reaction temperatures between 40° and 95° C. are effective for producing a degree of grafting on the copolymer between 3 and 100.

This invention is further exemplified by the following examples:

Example 1

18 parts of a rubbery copolymer of butadiene-1,3 and styrene copolymerized at 41° F., and containing 8% of bound styrene was dissolved in 82 parts of styrene monomer. This solution was heated in a flask at 120° C. with agitation, and under reflux until the reaction mass upon test had a solids content of 60%. Temperature was controlled by maintaining a pressure (300 mm. Hg) within the flask such that the reaction mass was at its boiling point, the heat of reaction being removed by refluxing vaporized monomeric styrene. When the solids content had increased to 60%, the reaction product was concentrated by distillation at temperatures up to 220 to 240° C. and at reduced pressure (15 mm. Hg) to a solids content of 98.0 to 99.5%. This rubbery product, amounting to 60 parts, was opaque and of a gray color and had a Rossi-Peakes flow at 135° C. of 1.0″–1.5″/300 sec. From this product the styrene grafted butadiene-styrene copolymer was isolated by the following procedure. The 60 parts of the product, in the form of pellets were allowed to soak for 24 hours at room temperature in 360 parts of dimethyl formamide. The liquid was separated from the swollen pellets by decanting the liquid through a piece of voile. The extraction was repeated with three fresh 240 parts portions of dimethyl formamide during successive 48 hour periods. At the end of the extraction, the swollen, insoluble portion was dried in a vacuum oven and then sheeted on a two-roll mill heated to 150° C. A nitrogen analysis indicated that less than 0.6% dimethyl formamide remained in the product. The weight of this dried, insoluble portion, which constitutes the styrene-grafted butadiene-styrene copolymer amounted to 21.8 parts of the reaction mixture which originally contained 18 parts of the rubbery copolymer of butadiene and styrene. Therefore, 3.8 parts of styrene had been grafted into the original butadiene-styrene copolymer and thus the copolymer had a degree of grafting of 21. In other words, the original copolymer containing 92 parts of bound butadiene to eight parts of bound styrene had been chemically changed so that as a styrene grafted copolymer it contained seventy-six (76) parts of bound butadiene and twenty-four (24) parts of bound styrene.

This styrene grafted butadiene-styrene copolymer was a light tan in color, and less tacky than the original butadiene-styrene copolymer. It had a Rossi-Peakes flow at 500 p.s.i. and 100° C. of .2–.4 in./300 sec. as compared to a Rossi-Peakes flow under the same conditions of 1.5 in./200 sec. for the original copolymer.

The next example illustrates the production from styrene monomer of a normally solid polystyrene homopolymer plasticized with a 36.3% by weight content of an in situ concurrently formed styrene-grafted butadiene-styrene copolymer.

Example 2

18 parts of a rubbery copolymer of butadiene and styrene that had been copolymerized at 41° F. and containing 8% of bound styrene was dissolved in 82 parts of styrene monomer. This solution was heated in an autoclave at 120° C. with agitation and under reflux until reaction had increased the total solids content to 60%. Temperature was controlled by maintaining a pressure (300 mm. Hg) within the autoclave such that the reaction mass was at its boiling point, the heat of reaction being removed by refluxing the vaporized monomeric styrene. When the solids content had increased to 60%, the reaction product was concentrated by distillation at reduced pressure (15 mm. Hg) to a solids content of 98.0–99.5%. This product was opaque, of a gray color, and had the following properties:

Rossi-Peakes flow at 135° C. _____ 1.0″–1.5″/300 sec.
Rossi-Peakes flow at 160° C. _____ 1.5″/40–60 sec.
Izod impact strength (ft. lbs./in.
  of milled notch) at 77° F. _____ 6.0–9.0.
Izod impact strength (ft. lbs./in.
  of milled notch) at −60° F. _____ 1.5–2.5.
Tensile, p.s.i. _____ 2,500–3,500.
Flexural, p.s.i. _____ 5,000–7,000.

The styrene grafted butadiene-styrene copolymer when extracted from the reaction product by the method described in Example 1, was found to be present to the extent of 36.3% by weight and have a degree of grafting of 21. The reaction product as such (without isolation of the styrene grafted butadiene-styrene copolymer) is suitable for injection molding, calendering, and extrusion. It can be blended by kneading or milling with colorants, such as pigments or dyes. Suitable stabilizers and antioxidants may be added. If desired, additional polystyrene homopolymer may be added to yield polystyrene mixtures of lower plasticizer content, such compositions exhibiting a somewhat lower impact resistance.

Example 3

Two parts of the product from Example 2 was milled with one part of polystyrene (98–99.5% solids and a 65,000 to 75,000 average molecular weight) on mixing rolls at 170° C. until the composition appeared homogeneous and then milled for an additional three minutes. The resulting thermoplastic material was opaque, light gray in color and could be injection molded into articles of high impact strength. The following properties are typical.

| | |
|---|---|
| Rossi-Peakes flow at 135° C. | 1.0/1.5″/30 sec. |
| Izod impact strength (ft. lbs./in. of milled notch): | |
| At 77° F. | 5.0–7.5. |
| At −20° F. | 1.3–2.3. |
| At −60° F. | 0.6–1.5. |
| Tensile (p.s.i.) | 3,600–4,300. |
| Flexural (p.s.i.) | 8,300–9,300. |
| Flexural modulus (p.s.i.) ×10$^5$ | 2.8–3.1. |
| ASTM heat distortion | 85° C. |
| Percent by weight of styrene grafted butadiene-styrene copolymer with degree of grafting of 21 | 24.2. |

Example 4

A number of plasticized polystyrene compositions were made which were suitable for extrusion or injection molding by compounding different proportions of polystyrene (98–99.5% solids and of 65,000 average molecule weight) with the reaction product of Example 2 consisting of styrene-grafted butadiene-styrene copolymer and polystyrene homopolymer as follows:

(a) Five parts of the product from Example 2 and one part polystyrene.
(b) One part of the product from Example 2 and one part polystyrene.
(c) One part of the product from Example 2 and two parts polystyrene.
(d) One part of the product from Example 2 and five parts polystyrene.

The physical properties of these plasticized polystyrene compositions are given in the following table:

| | Styrene-grafted Butadiene-styrene Copolymer Content | Izod Impact Strength (ft. lbs./in. of milled notch) | | | | Tensile, p.s.i. | Flexural, p.s.i. | Flexural Modulus | Heat Distortion, °C. |
|---|---|---|---|---|---|---|---|---|---|
| | | 77° F. | −20° F. | −40° F. | −60° F. | | | | |
| (a) | 30.3 | 9 | 2.8 | 2.0 | 1.4 | 2,700 | 4,300 | 3 | 79 |
| (b) | 18.2 | 5 | 1.5 | 1.0 | 0.7 | 3,800 | 9,300 | 3.7 | 85 |
| (c) | 12.1 | 2.7 | 0.9 | 0.7 | 0.5 | 4,800 | 11,600 | 4.2 | 84 |
| (d) | 6.1 | 0.8 | 0.6 | 0.6 | 0.4 | 6,100 | 13,800 | 4.5 | 87 |

Example 5

100 parts of a synthetic rubber latex consisting of a water emulsion of a copolymer of butadiene and styrene (approximately 25% by weight of bound styrene) stabilized with soaps of fatty and rosin acids and having a solids content of 58.0% were mixed with 400 parts of a monomeric styrene emulsion, consisting of a water emulsion of styrene stabilized with 0.5 part of sodium oleate, and having a styrene content of 23% by weight. This mixture to which 0.5 part of potassium persulfate as catalyst was added was heated to 50° C. with agitation, and under a nitrogen atmosphere. Temperature was maintained at 50° C. for 2 hours at which time all the monomeric styrene had been converted to styrene grafted butadiene-styrene copolymer and polystyrene homopolymer. To the reaction mixture were added 100 parts of polystyrene emulsion, consisting of a water emulsion of polystyrene of about 90,000 average molecular weight and stabilized with soaps of fatty acids and rosin acids, the emulsion having a solids content of 23%. Conventional rubber antioxidants can also be added, if desired. The blended emulsions were then dried at 150° C. on a drum drier, and the dried product milled and diced. Instead of drum drying the solids may be recovered from the emulsion by conventional precipitation procedures using aqueous chloride-sulfuric acid solutions, isopropanol-water solutions or acetic acid-water mixtures. The resulting light gray, opaque plasticized polystyrene composition could be injection molded at temperatures of 520° F. The following properties were typical of injection molded samples.

| | |
|---|---|
| Izod impact strength (ft. lbs./in. of milled stock) at 77° F | 5.3 |
| Tensile strength, p.s.i. | 4,200 |
| Flexural, p.s.i. | 7,530 |
| Flexural modulus, p.s.i. | 2.4×10$^5$ |
| Heat distortion, ° C. | 86 |

The amount of styrene grafted butadiene-styrene copolymer present in this polystyrene composition, as determined by the method described in Example 1, was 35% by weight and the degree of grafting was 5.

Example 6

20 parts of a rubbery copolymer of butadiene-1,3 and styrene that had been copolymerized at 122° F. and containing 20% bound styrene were dissolved in 80 parts of monomeric styrene. The solution was heated in a closed container in an atmosphere of nitrogen at 80° C. for 32 hours, then at 90° C. for 64 hours, then at 100° C. for 48 hours, and then at 120° C. for 48 hours. The resulting solid thermoplastic product was fluxed on milling rolls until the composition appeared homogeneous and then milled an additional 5 minutes at 170° C. to remove volatiles to a solids content of 98–99%. The opaque, gray-colored product had the following properties.

| | |
|---|---|
| Izod impact strength (ft. lbs./in. of milled notch) at 77° F | 7.11 |
| Tensile (p.s.i.) | 2710 |
| Flexural (p.s.i.) | 7680 |
| Flexural modulus | 4×10$^5$ |
| ASTM heat distortion, ° C. | 78 |

The styrene grafted butadiene-styrene copolymer when extracted from the reaction product by the method described in Example 1 was found to be present to the extent of 37.2% by weight and have a degree of grafting of 86.

Example 7

20 parts of a rubbery copolymer of butadiene-1,3 and styrene that had been copolymerized at 41° F. and containing 10% of bound styrene were dissolved in 80 parts of monomeric styrene. The solution was heated as described in Example 6. The resulting solid thermoplastic product was fluxed on milling rolls until the composition appeared homogeneous and milled an additional five minutes at 170° C. to remove volatiles to a solids content of 98–99%. The opaque, gray colored product had the following properties.

Izod impact strength (ft. lbs./in. of milled notch)
  at 77° F _____ 6.75
Tensile, p.s.i _____ 2730
Flexural, p.s.i _____ 7900
Flexural modulus _____ $4 \times 10^5$
ASTM heat distortion, ° C _____ 80

The styrene grafted butadiene-styrene copolymer when extracted from the reaction product by the method described in Example 1 was found to be present to the extent of 33.2% by weight and have a degree of grafting of 66.

*Example 8*

30 parts of a rubbery copolymer of butadiene-1,3 and styrene that had been copolymerized at 125° F. and containing 3% bound styrene was dissolved in 70 parts of monomeric styrene. The solution was heated as described in Example 6 and the resulting reaction product was fluxed on milling rolls until the composition appeared homogeneous and then given an additional milling for 5 minutes at 170° C. to remove volatiles to a solids content of 98–99%. This product had the following properties.

Izod impact strength (ft./lbs./in. of milled notch):
  at 77° F _____ 8.23
  At −20° F _____ 8.28
  At −40° F _____ 6.63
Tensile, p.s.i _____ 1100
Flexural, p.s.i _____ 3480
Flexural modulus _____ $2.3 \times 10^5$
ASTM heat distortion temp. ° C _____ 74

The styrene grafted butadiene-styrene copolymer when extracted from the reaction product by the method described in Example 1 was found to be present to the extent of 43.5% by weight and have a degree of grafting of 45.

*Example 9*

Sixty parts of a rubbery copolymer of butadiene-1,3 and styrene that had been copolymerized at 41° F. and containing 10% of bound styrene was dissolved in 40 parts of monomeric styrene. The solution was heated under the same conditions as described in Example 6. The resulting thermoplastic reaction product was fluxed on the milling rolls until homogeneous and then given an additional milling of 5 minutes at 170° C. to remove volatiles to a total solids content of 98–99%. The styrene grafted butadiene-styrene copolymer when extracted from the reaction product by the method described in Example 1 was found to be present to the extent of 88.2% by weight and have a degree of grafting of 47.

The previous examples have shown numerical data as to the physical properties of polystyrene compositions plasticized with from 6.1% to 43.5% by weight of styrene grafted butadiene-styrene copolymers. As will be understood by those skilled in this art, the quantity of styrene grafted copolymer employed as plasticizer is not restricted to such range, but may be more or less depending on the physical properties desired in the resultant compositions. In general, as the quantity of styrene grafted copolymer present as plasticizer in admixture with polystyrene homopolymer is increased, the resultant compositions progressively exhibit the rubber-like elasticity and flexibility of the styrene grafted copolymers, and conversely with small amounts, about 1–5%, of plasticizer, the compositions largely exhibit the rigidity and hardness of conventional normally solid polystyrene homopolymers.

The styrene grafted butadiene-styrene copolymers of this invention can be used as such for molding into flexible articles having excellent resistance to many solvents that attack or dissolve the unmodified butadiene-styrene copolymers.

What is claimed is:

1. A rubbery styrene-grafted butadiene-styrene copolymer being the polymerization reaction product of a reaction charge of styrene monomer and a rubbery butadiene-styrene copolymer containing between 3 and 50% by weight of bound styrene, said reaction being continued to a stage where the initial weight of the said butadiene-styrene copolymer constitutes from 20 to 60 percent by weight of the reaction product solids and in which from 3 to 100 parts by weight of styrene have been reacted on 100 parts by weight of said butadiene-styrene copolymer, said styrene-grafted butadiene-styrene being characterized by its insolubility in benzene, carbon tetrachloride, chloroform, dimethyl formamide, carbon disulfide and styrene.

2. Plasticized polystyrene composition comprising normally solid polystyrene homopolymer in admixture with a rubbery, styrene-grafted butadiene-styrene copolymer obtained by polymerizing a reaction charge of styrene monomer and a rubbery copolymer of butadiene-1,3 and styrene containing between 3 and 50% by weight of bound styrene and to a stage where the initial weight of the said rubbery copolymer constitutes from 20 to 60 percent by weight of the said reaction product solids and in which from 3 to 100 parts by weight of styrene have been reacted on 100 parts by weight of said rubbery copolymer.

3. Plasticized normally solid polystyrene composition comprising the substantially complete reaction-polymerization product of a reaction charge consisting of between 80 and 40 parts by weight of styrene monomer and between 20 and 60 parts by weight of a rubbery copolymer of butadiene-1,3 and styrene containing between 3 and 50% by weight of bound styrene.

4. Plasticized normally solid polystyrene composition comprising the substantially complete reaction-polymerization product of a reaction charge consisting of between 80 and 40 parts by weight of styrene monomer and between 20 and 60 parts by weight of a rubbery copolymer of butadiene-1,3 and styrene containing between 3 and 50% by weight of bound styrene thereby forming a styrene-grafted butadiene-styrene copolymer in which from 3 to 100 parts by weight of styrene have been reacted on 100 parts by weight of said rubbery copolymer in admixture with normally solid polystyrene.

5. A rubbery styrene-grafted butadiene-styrene copolymer substantially free of styrene monomer resulting from polymerization at temperatures between 70° and 200° C. until a solids content between 50 and 70 percent by weight is obtained from a reaction charge of styrene monomer and a rubbery copolymer of butadiene-1,3 and styrene containing between 3 and 50% by weight of bound styrene, said rubbery copolymer constituting between 15 and 30% by weight of the reaction charge, and wherein the initial weight of the said rubbery copolymer constitutes from 20 to 60 percent by weight of the reaction products solids and in which from 3 to 100 parts by weight of styrene have been reacted on 100 parts by weight of said rubbery copolymer.

6. Plasticized normally solid polystyrene composition comprising a reaction-polymerization product substantially free of styrene monomer resulting from polymerizing at temperatures between 70 and 200° C. until a solids content between 50 and 70 percent by weight is obtained from a reaction charge consisting of styrene monomer and a rubbery copolymer of butadiene-1,3 and styrene containing between 3 and 50% by weight of bound styrene, said rubbery copolymer constituting between 15 and 30% by weight of the reaction charge and wherein the initial weight of the said rubbery copolymer constitutes from 20 to 60 percent by weight of the reaction products solids, and in which from 3 to 100 parts by weight of styrene have been reacted on 100 parts by weight of said rubbery copolymer, in admixture with normally solid polystyrene.

7. Plasticized polystyrene composition comprising the substantially complete reaction-polymerization product of a reaction charge consisting of between 20 and 60% by weight of a rubbery copolymer of butadiene-1,3 and styrene containing between 3 and 50% by weight of bound styrene and respectively between 80 and 40% by weight of styrene monomer, said composition in molded form having an Izod impact strength (ft. lbs./in. of milled notch) of at least 5.0 at 77° F. and between 0.6 and 2.5 at −60° F., a tensile strength between about 1100 and 4300 lbs. per sq. in., and a flexural strength between about 3500 and 7000 lbs. per sq. in.

8. Process of preparing a styrene grafted copolymer of butadiene-1,3 and styrene which comprises forming a reactive mixture consisting of a rubbery copolymer of butadiene-1,3 and styrene containing between 3 and 50% by weight of bound styrene and an amount of styrene monomer such that in the subsequently formed reaction product the copolymer constitutes between 20 and 60% by weight of the reaction solids, reacting the mixture of styrene monomer and the copolymer at a temperature which normally effects polymerization of styrene monomer to solid polystyrene homopolymer to a stage less than complete polymerization of the styrene monomer until a mixed reaction product is obtained comprising essentially polystyrene homopolymer and styrene grafted butadiene-styrene copolymer, at which stage the initial weight of the said rubbery copolymer constitutes between 20 and 60 percent by weight of the reaction mixture solids, and in which between 3 and 100 parts by weight of styrene have been reacted on 100 parts by weight of said rubbery copolymer.

9. Process of preparing a plasticized normally solid polystyrene composition which comprises forming a reactive mixture consisting of a copolymer of butadiene-1,3 and styrene containing between 3 and 50% by weight of bound styrene and of an amount of styrene monomer such that in the subsequently formed mixed reaction product the copolymer constitutes between 20 and 60 percent by weight of the reaction solids, reacting the mixture at a temperature which normally affects polymerization of styrene monomer to solid polystyrene homopolymer to a stage less than complete polymerization of the styrene monomer until a mixed reaction product is obtained comprising essentially polystyrene homopolymer and styrene-grafted butadiene-styrene copolymer at which stage the initial weight of the said rubbery copolymer constitutes between 20 and 60 percent by weight of the reaction mixture solids, and in which between 3 and 100 parts by weight of styrene have been reacted on 100 parts by weight of said rubbery copolymer, and then removing unreacted styrene monomer from the reaction product and admixing the resulting styrene-free reaction product with additional normally solid polystyrene.

10. Process of preparing a styrene-grafted copolymer of butadiene-1,3 and styrene which comprises reacting at a temperature between 100 and 140° C. a mixture consisting of a rubbery copolymer of butadiene-1,3 and styrene containing between 3 and 50% by weight of bound styrene and of a styrene monomer in such proportions that the rubbery copolymer constitutes from 15 to 30 percent of the reaction charge and between 20% and 60% by weight of the resultant reaction products consisting essentially of polystyrene homopolymer and styrene-grafted butadiene-styrene copolymer on which from 3 to 100 parts by weight of styrene have been reacted on 100 parts by weight of said rubbery copolymer.

11. Process of preparing a plasticized normally solid polystyrene composition which comprises reacting together at a temperature between 40° and 95° C. a reactive mixture consisting of a water-emulsion latex of a rubbery butadiene-styrene copolymer containing between 3 and 50% by weight of bound styrene and a water-emulsion of styrene monomer, the copolymer constituting between 20 and 60 percent by weight of the charged reactants and the styrene monomer being respectively between 80 and 40 percent by weight of the charged reactants, continuing the reaction until substantially all the styrene has reacted to form polystyrene homopolymer and styrene-grafted butadiene-styrene copolymer, and then removing water from the reaction products.

References Cited in the file of this patent

UNITED STATES PATENTS

| | | |
|---|---|---|
| 2,356,965 | Allison | Aug. 29, 1944 |
| 2,382,498 | Morley | Aug. 14, 1945 |
| 2,606,163 | Morris et al. | Aug. 5, 1952 |
| 2,609,353 | Rubens et al. | Sept. 2, 1952 |
| 2,646,418 | Lang | July 21, 1953 |
| 2,668,806 | Howard et al. | Feb. 9, 1954 |
| 2,683,127 | Griess | July 6, 1954 |
| 2,694,692 | Amos et al. | Nov. 16, 1954 |
| 2,745,818 | TeGrotenhuis | May 15, 1956 |
| 2,755,270 | Hayes | July 17, 1956 |

FOREIGN PATENTS

| | | |
|---|---|---|
| 649,166 | Great Britain | Jan. 17, 1951 |
| 679,562 | Great Britain | Sept. 17, 1952 |
| 999,594 | France | Oct. 3, 1951 |

OTHER REFERENCES

Billmeyer: "Textbook of Polymer Chemistry," pages 239–240 (1957), Interscience Publishing Company, New York.